US007000780B1

(12) United States Patent
Martin et al.

(10) Patent No.: US 7,000,780 B1
(45) Date of Patent: Feb. 21, 2006

(54) METHOD AND DEVICE FOR DRYING, SEPARATING, CLASSIFYING AND DECOMPOSING RECOVERABLE WASTE PRODUCTS

(76) Inventors: Harald Martin, Fliederweg 61, D-06567, Bad Frankenhausen (DE); Hartwig Streitenberger, Kunitzer Strasse 26, D-07751, Golmsdorf (DE)

( * ) Notice: Subject to any disclaimer, the term of this patent is extended or adjusted under 35 U.S.C. 154(b) by 342 days.

(21) Appl. No.: 10/030,178

(22) PCT Filed: Aug. 2, 2000

(86) PCT No.: PCT/DE00/02658

§ 371 (c)(1), (2), (4) Date: Mar. 11, 2002

(87) PCT Pub. No.: WO01/08823

PCT Pub. Date: Feb. 8, 2001

(30) Foreign Application Priority Data

Aug. 3, 1999 (DE) ................................ 199 37 521

(51) Int. Cl.
*B04C 5/14* (2006.01)

(52) U.S. Cl. ...................................... 209/720; 209/719

(58) Field of Classification Search .................. 209/11, 209/135, 137, 139.1, 719; 110/204, 205, 110/216, 244, 245, 346

See application file for complete search history.

(56) References Cited

U.S. PATENT DOCUMENTS

| | | | | |
|---|---|---|---|---|
| 1,972,929 A | 9/1934 | Fisher | | |
| 4,123,332 A | 10/1978 | Rotter | | |
| 4,177,742 A * | 12/1979 | Uemura et al. | ............. | 110/346 |
| 4,253,824 A * | 3/1981 | Foote | .......................... | 432/58 |
| 4,270,468 A * | 6/1981 | Robinson et al. | ........... | 110/245 |
| 4,308,806 A * | 1/1982 | Uemura et al. | ............. | 110/244 |
| 4,412,889 A | 11/1983 | Oeck | | |
| 4,501,644 A | 2/1985 | Thomas | | |
| 5,044,287 A * | 9/1991 | Furukawa et al. | .......... | 110/346 |
| 5,425,317 A | 6/1995 | Schaub et al. | | |
| 5,453,251 A * | 9/1995 | Vidal et al. | ................. | 422/145 |
| 6,321,540 B1 * | 11/2001 | Miyoshi et al. | ............... | 60/670 |

FOREIGN PATENT DOCUMENTS

| | | |
|---|---|---|
| DE | 2546801 | 4/1977 |
| DE | 2816282 | 10/1979 |
| DE | 3417620 | 11/1985 |
| DE | 3632105 | 4/1987 |
| DE | 3826520 | 2/1990 |
| DE | 4139512 | 6/1993 |
| DE | 4226632 | 7/1993 |
| DE | 4209549 | 9/1993 |
| DE | 4230311 | 12/1993 |
| DE | 4235412 | 4/1994 |
| DE | 4237161 | 5/1994 |
| DE | 4337421 | 1/1995 |
| DE | 4334544 | 4/1995 |
| DE | 19528018 | 2/1997 |
| DE | 4441423 | 6/1997 |
| DE | 19612037 | 10/1997 |
| DE | 19714593 | 10/1998 |
| EP | 0280364 | 8/1988 |
| EP | 0426925 | 5/1991 |
| EP | 0609802 | 8/1994 |
| EP | 609802 | 8/1994 |
| JP | 01239309 A * | 9/1989 |
| WO | 94/18287 | 8/1994 |
| WO | 99/04197 | 1/1999 |
| WO | 00/17288 | 3/2000 |
| WO | 01/09267 | 2/2001 |

* cited by examiner

*Primary Examiner*—Donald P. Walsh
*Assistant Examiner*—Joseph Rodriguez
(74) *Attorney, Agent, or Firm*—Greenblum & Bernstein, P.L.C.

(57) ABSTRACT

Method and apparatus used in the field of waste management, especially a method and a device for treating recoverable waste products that have already partially decomposed. The aim of the invention is to provide a method and a device which makes it possible to further decompose, if possible completely, and recover the residual products that remain once the waste products are degassed. According to the inventive method, air and waste gases are introduced separately from the bottom into the chamber and pressure is applied. The air is introduced into the chamber in a substantially axial orientation and waste gases in a substantially tangential or radial orientation. The invention further provides a device the funnel-shaped bottom of which is provided with openings for air and waste gases to enter. The air is introduced into the reactor chamber from the bottom in a substantially axial orientation and the waste gases in a substantially tangential or radial orientation.

15 Claims, No Drawings

METHOD AND DEVICE FOR DRYING, SEPARATING, CLASSIFYING AND DECOMPOSING RECOVERABLE WASTE PRODUCTS

TECHNICAL FIELD

The invention relates to the fields of mechanical engineering, waste management, and the paper industry, and concerns a method and a device for drying, separating, classifying, and decomposing recoverable waste products, especially already partially decomposed waste products that result after a degassing or gasification process (pyrolysis).

DISCUSSION OF BACKGROUND INFORMATION

In the processing of recovered paper in the recycling process, residual substances remain after the slurrying of the mechanical desludging. These residual substances can contain, in varying amounts, concentration, and type, clumped paper, cardboard residues, pieces of plastic, wood residues, metal parts, and more besides. All of these residual substances are called rejects.

After exiting the slurry process and optionally after an intermediate storage in which a gravimetric dewatering can take place, these rejects are generally deposited in a hazardous waste landfill.

At this point, these rejects contain on average 50% water, which can occur as surface water and also as water absorbed in the paper and wood portion.

Various methods and devices are already known or have been described that include the processing and/or incineration and/or gassing of waste, residual substances, and also rejects.

According to EP 0 609 802 A1, a method and a device are known for the continuous degassing and/or gasification of a solid combustible or waste material.

The device comprises a shaft-like reactor in which the charge, the gaseous gasification agent and the gaseous combustible produced are conducted downwards co-currently. The gasification agent is preheated by the gaseous combustible in a screw-shaped counterflow heat exchanger situated in the jacket part. This preheated gasification agent is further heated in helical or undulating channels in the ceramic furnace body of the reactor and in a movable or fixed conical or paraboloid-shaped central body projecting into the lower part of the charge and serving as a furnace closure. The grate is formed by a rotatable opposing piece representing a full cone or a hollow-cone-shaped annular body that can be displaced vertically, which opposing piece leaves open opposite the lower part of the furnace, an adjustable annular passage for the withdrawal of the gaseous combustible produced and for the discharge of the solid or liquid reaction products in the form of ash, slag, distillation residues.

A waste incinerator and a process for the incineration of waste is known from DE 28 16 282 A1. The incinerator comprises a hollow body having an open upper and lower end, a floor plate that seals the lower end, and a central opening and a plurality of openings in the floor plate arranged in the circumferential direction through which oxidation gas under pressure can travel into the hollow body, heat transfer particles in the hollow body that are fluidized by the oxidation gas, and an apparatus for feeding the waste from above.

A fluidized bed is formed over the floor plate by the heat transfer particles, in that the oxidation gas is blown in through the central opening and through the openings arranged in the circumferential direction vertically upwards and horizontally in the circumferential direction. The waste is conducted into the fluidized bed and is incinerated there, and incineration gases forming in the chamber are incinerated above the fluidized bed.

The disadvantage of this method and device is that the solid combustibles or waste are not completely degassed and/or gasified.

SUMMARY OF THE INVENTION

The object of the invention is to provide a method and a device that after the degassing and/or gasification of waste, further converts the remaining residual products as completely as possible and recovers them.

By means of the device according to the invention and the method according to the invention, it is possible to further convert recoverable waste products as completely as possible and in particular the not yet completely decomposed waste from degassing or gasification processes, so that they can be passed on to the environment and/or landfills substantially without special measures and as free as possible of pollutants.

The present invention is directed to a process for drying, separating, classifying, and decomposing waste products from at least one of a waste degassing and gasification process, comprising introducing solid waste products and waste gases wholly or partially in a funnel-shaped lower part of a shaft-like chamber, and at least one of simultaneously and subsequently introducing air and the waste gases from the degassing and/or gasification process separately into the chamber from below under pressure, the air is introduced into the chamber substantially axially and the waste gases are introduced into the chamber substantially tangentially, resulting in a rotationally symmetrical, fountaining eddying of the solid and gaseous substances in the chamber, and, subsequently or during continuous processing, dried, separated, classified, and substantially decomposed products are downwardly discharged from the chamber.

The recoverable waste products can comprise coke, ash, hydrocarbons, $CO_2$, CO, $H_2$, $H_2O$.

The air can be introduced in a truncated-cone-shaped floor of the chamber axially through a round, double-walled part of a discharge shaft.

The air can be at least one of preheated and introduced into the chamber under a pressure of 6–8 kPa.

The waste gases can be introduced tangentially through openings in the funnel-shaped part of the chamber so that the gases encounter the introduced air in an area of the solids.

The waste gases can be introduced into the chamber under a pressure of 6–8 kPa.

The device according to the invention functions as follows. The solid recoverable waste products from for example a pyrolysis process in which the waste has already been partially or largely converted, are introduced into a shaft-like chamber from above and/or together with the waste gas. They are deposited first in the funnel-shaped lower part of the chamber. The funnel-shaped part can advantageously be constructed in the shape of a truncated cone or in the shape of a shaft thereby and be arranged linearly, centrally, and/or decentralized. After the first solid recoverable waste products have been deposited and then during the further charging of the chamber with the solid recoverable waste products, air, advantageously prewarmed air, is blown in from below through the double-walled part of the discharge opening, which is arranged in the center in the funnel-shaped part of the chamber. This takes place advantageously under a pressure of 6–8 kPa.

The funnel-shaped part of the chamber is advantageously constructed in the shape of a truncated cone and wholly or partially with double walls in its upper part, whereby a defined gap can be implemented between the two walls.

Simultaneously the waste gases from the pyrolysis process, the pyrolysis gas, and/or a solid/gas mixture, likewise advantageously from the pyrolysis process, are introduced into the chamber tangentially, through the likewise double-walled feed shaft parallel to the funnel-shaped part of the chamber. Openings force the pyrolysis gas and/or the solid/gas mixture into the area of the deposited solid and into the solid, where it meets the introduced air. The pyrolysis gas is likewise introduced under a pressure of 6–8 kPa.

The openings through which the air and the waste gases arrive in the chamber are advantageously formed by two truncated-cone-shaped components nested one inside the other in the truncated-cone-shaped part of the chamber. An annular gap is formed respectively by these components between the chamber wall and the first component, and between the two truncated-cone-shaped components. These annular gaps are again likewise advantageously variable, in that the components are arranged so that they can be displaced with respect to one another and to the chamber wall. By changing the size of the annular gap, the flow rate of the amount of introduced air and waste gas can be regulated.

As it passes through the solid bed, the pyrolysis gas is freed of solid constituents, such as coke and ash.

The introduced air can already react with the solids as it passes through the solid bed. The carbon present and the hydrocarbons are thereby converted to CO, $CO_2$, $H_2O$ and $H_2$. The heat of reaction released thereby causes the temperature to rise in the solid bed and causes the temperature of the gas mixture to rise to about 1200° C. This temperature is sufficient to crack the higher gaseous hydrocarbons in the gas mixture.

A burner is installed in the upper, advantageously cylindrical, part of the chamber to start the entire process and to ensure the reaction temperature.

The gas exiting in the upper area of the chamber is largely freed of carbon and higher hydrocarbons and exhibits nitrogen and a high percentage of CO and $H_2$. The solid particles still present in the gas can be separated in a downstream centrifugal cyclone separator.

The largely converted carbon- and hydrocarbon-free solid material can be discharged through the discharge opening. The residual substances not converted, such as ash- and carbon residues, are collected in the centrally arranged collecting funnel and are discharged via the subsequent shaft with the ash discharge.

Due to the air-pyrolysis gas mixture blown upwards, a rotationally symmetrical eddy that has the shape of a fountain in the axial direction is formed in the chamber, by means of which the loosely deposited solid is picked up and carried from the chamber wall into the axial area of the chamber. There the completely or partially converted solids fall down onto the chamber floor at different points, depending on their density, and thus can be extracted, advantageously in classified form. Solids that can not be lifted by the air flowing in are likewise extracted through the discharge opening.

The flow that develops is stable and can be further stabilized by incorporating a guide pipe to make the circulation of the solids uniform when the fill height varies. Even variations of the air throughput can not change the flow in wide areas.

BEST WAY OF CARRYING OUT THE INVENTION

The invention is explained in more detail below based on an exemplary embodiment.

The shaft-like chamber is a cylindrical container with a diameter of 2000 mm and a jacket length of 4000 mm, closed at the top with a bumped head and constructed in the lower area in the shape of a truncated cone with a slope of 45°. A tangentially cut gas vent pipe with a diameter of 500 mm is situated in the upper area of the jacket. The chamber is seated on a mount in the area of the transition between the cylindrical part and the truncated-cone-shaped part of the container. The jacket of the container is made of carbon steel and is protected from the reaction gases with a brick lining 200 mm thick. The truncated-cone-shaped floor has in an axial orientation an adapter flange with a diameter of 1000 mm for the air feed. The truncated-cone-shaped floor part moreover has a lateral annular gap cut over 180°, via which the waste gas and the solids are together introduced tangentially at a flow rate of 20 m/s and are distributed uniformly over the circumference of the chamber. Two guide blades formed in the shape of truncated cones are arranged one inside the other in the form of a funnel towards the center. The larger and more deepset has a diameter of 700 mm and the other has a diameter of 500 mm. The air entering axially upwards penetrates the solid bed and encounters the waste gases. The gas mixture draws the solid particles outwards and up the container wall and reacts thereby with the gas mixture. The flow falls inwards and becomes calm in the upper third of the container, so that the not yet thermally decomposed carbon particles and the ash portions fall downwards again. There they encounter a collecting funnel arranged in the center, which funnel passes through to the lower area and is emptied by a screw conveyor. The hot gas mixture causes a reaction with the 700° C. carbon particles, releasing energy that heats the gas mixture and the reactor wall to 1200° C. Due to the large cross section of the container and the associated flow calming, sufficient reaction time is provided to decompose the carbon into CO and $CO_2$. The residual moisture of the process gas is converted with carbon thereby to CO and $H_2$. The two components described in the shape of truncated cones, between which the air and the waste gases exit, are arranged so that they can be displaced via attachments so that the flow rates can be optimized. The two components are made of ceramic.

To ensure that a chemical reaction is initiated, in particular in the starting process and later as a safety ignition source, a pilot burner in the form of a plasma burner with a power of 4 kW, which works independent of pressure and can be switched on and off in any operating situation, is arranged axially in the lower cylindrical part of the container.

What is claimed is:

1. A process for drying, separating, classifying, and decomposing waste products from at least one of a waste degassing and gasification process, comprising:

introducing solid waste products and waste gases wholly or partially in a funnel-shaped lower part of a shaft-shaped chamber;

at least one of simultaneously and subsequently introducing air and the waste gases from the degassing and/or gasification process separately into the chamber from below under pressure;

introducing the air into the chamber substantially axially and introducing the waste gases into the chamber substantially tangentially, resulting in a rotationally symmetrical, fountaining eddying of the solid and gaseous substances in the chamber, the air is introduced in a truncated-cone-shaped floor of the chamber axially through a round, double-walled part of a discharge shaft and, in an area of the truncated-cone-shaped floor of the chamber, one or two truncated-cone-shaped components nested one inside another form one or two annular gaps that can be displaced with respect to one another and to the chamber floor so that the air is introduced axially through an annular gap and the waste gases are introduced tangentially through another annular gap; and subsequently or during continuous processing, downwardly discharging dried, separated, classified, and substantially decomposed products from the chamber.

2. The process according to claim 1, wherein the substantially decomposed products comprise recoverable waste products comprising coke, ash, hydrocarbons, $CO_2$, CO, $H_2$, $H_2O$.

3. The process according to claim 2, wherein the air is at least one of preheated and introduced into the chamber under a pressure of 6–8 kPa.

4. The process according to claim 2, wherein the waste gases are introduced tangentially through openings in the funnel-shaped part of the chamber so that the gases encounter the introduced air in an area of the solids.

5. The process according to claim 2, wherein the waste gases are introduced into the chamber under a pressure of 6–8 kPa.

6. The process according to claim 1, wherein the air is at least one of preheated and introduced into the chamber under a pressure of 6–8 kPa.

7. The process according to claim 6, wherein the waste gases are introduced tangentially through openings in the funnel-shaped part of the chamber so that the gases encounter the introduced air in an area of the solids.

8. The process according to claim 6, wherein the waste gases are introduced into the chamber under a pressure of 6–8 kPa.

9. The process according to claim 1, wherein the waste gases are introduced tangentially through openings in the funnel-shaped part of the chamber so that the gases encounter the introduced air in an area of the solids.

10. The process according to claim 9, wherein the waste gases are introduced into the chamber under a pressure of 6–8 kPa.

11. The process according to claim 1, wherein the waste gases are introduced into the chamber under a pressure of 6–8 kPa.

12. The process according to claim 1, comprising regulating air- and waste gas flow rate.

13. The process according to claim 1, comprising regulating air- and/or waste gas flow rates by changing annular gap size.

14. The process according to claim 1, wherein the chamber is cylindrical, and initiating reaction in a start-up condition with a pilot burner arranged in the chamber, and ensuring constant maintenance of the reaction in an operating condition.

15. A process for drying, separating, classifying, and decomposing waste products from at least one of a waste degassing and gasification process, comprising:

introducing solid waste products and waste gases wholly or partially in a funnel-shaped lower part of a shaft-shaped chamber;

at least one of simultaneously and subsequently introducing air and the waste gases from the degassing and/or gasification process separately into the chamber from below under pressure;

introducing the air into the chamber substantially axially and introducing the waste gases into the chamber substantially tangentially or radially, resulting in a rotationally symmetrical, fountaining eddying of the solid and gaseous substances in the chamber, the air is introduced in a truncated-cone-shaped floor of the chamber axially through a round, double-walled part of a discharge shaft and, in an area of the truncated-cone-shaped floor of the chamber, one or two truncated-cone-shaped components nested one inside another form one or two annular gaps that can be displaced with respect to one another and to the chamber floor so that the air is introduced axially through an annular gap and the waste gases are introduced tangentially through another annular gap; and subsequently or during continuous processing, downwardly discharging dried, separated, classified, and substantially decomposed products from the chamber.

* * * * *